United States Patent
Kamei

(10) Patent No.: US 7,406,012 B2
(45) Date of Patent: Jul. 29, 2008

(54) SEMICONDUCTOR LASER DRIVING DEVICE, OPTICAL HEAD DEVICE, OPTICAL INFORMATION PROCESSING DEVICE, AND OPTICAL RECORDING MEDIUM

(75) Inventor: Tomotada Kamei, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/532,767

(22) PCT Filed: Oct. 21, 2003

(86) PCT No.: PCT/JP03/13404

§ 371 (c)(1),
(2), (4) Date: Apr. 27, 2005

(87) PCT Pub. No.: WO2004/038711

PCT Pub. Date: May 6, 2004

(65) Prior Publication Data

US 2005/0286392 A1    Dec. 29, 2005

(30) Foreign Application Priority Data

Oct. 28, 2002   (JP)   ............................ 2002-312435

(51) Int. Cl.
G11B 7/00    (2006.01)
(52) U.S. Cl. ................... 369/53.18; 369/53.26
(58) Field of Classification Search .............. None
See application file for complete search history.

(56) References Cited

U.S. PATENT DOCUMENTS 5,005,164 A  *  4/1991  Sakamoto et al. ........ 369/47.53
5,146,464 A  *  9/1992  Uemura ................... 372/38.07
5,175,722 A  * 12/1992  Minami et al. ............. 369/116
5,309,461 A  *  5/1994  Call et al. ................ 372/38.09
5,793,736 A  *  8/1998  Ishimaru et al. .......... 369/53.26
6,707,833 B1 *  3/2004  Kimbrough .............. 372/38.02
6,731,584 B1 *  5/2004  Nagara ....................... 369/116
6,967,914 B2 * 11/2005  Udagawa et al. .......... 369/47.51

(Continued)

FOREIGN PATENT DOCUMENTS

JP           6-274919         9/1994

(Continued)

*Primary Examiner*—Joseph Feild
*Assistant Examiner*—Christopher R Lamb
(74) *Attorney, Agent, or Firm*—Wenderoth, Lind & Ponack, L.L.P.

(57) ABSTRACT

In order to make it possible to reproduce information recorded on an optical recording medium without causing deterioration in the information, a semiconductor laser driving device include a semiconductor laser, a photodetecting element for receiving a part of light emitted from the semiconductor laser and converting the part of light into an electric signal corresponding to a light amount; a laser driving circuit for inputting a driving signal into the semiconductor laser in such a manner that an average value of the electric signal coincides with a given target value, and a high-frequency superimposing control section for controlling an amplitude of the high-frequency signal. The high-frequency superimposing control section controls the amplitude in such a manner that a peak-to-average ratio that is a ratio of a peak value of the electric signal with respect to the average value of the electric signal does not increase above a given reference value.

8 Claims, 11 Drawing Sheets

U.S. PATENT DOCUMENTS

| | | | |
|---|---|---|---|
| 2002/0044509 A1* | 4/2002 | Nakajima | 369/53.22 |
| 2003/0090981 A1* | 5/2003 | Yokoi | 369/59.11 |

FOREIGN PATENT DOCUMENTS

| | | |
|---|---|---|
| JP | 2001-56953 | 2/2001 |
| JP | 2001-352124 | 12/2001 |
| JP | 2003-59083 | 2/2003 |

* cited by examiner

| Vm | T | φ | R |
|---|---|---|---|
| a1 | b1 | c1 | d1 |
| a2 | b2 | c2 | d2 |
| a3 | b3 | c3 | d3 |

8

SEMICONDUCTOR LASER DRIVING DEVICE, OPTICAL HEAD DEVICE, OPTICAL INFORMATION PROCESSING DEVICE, AND OPTICAL RECORDING MEDIUM

TECHNICAL FIELD

The present invention relates to a semiconductor laser driving device for recording, reproducing, or erasing information on an optical recording medium (including an optical magnetic recording medium) such as an optical disc and an optical card, an optical head device including the device, an optical information processing device, and an optical recording medium.

BACKGROUND ART

An optical memory technology which uses optical recording media having pit-shaped patterns as high-density and high-capacity recording media is increasing its applications to wider ranges such as digital audio discs, video discs, text file discs, and also data files. The optical memory technology records and reproduces information on optical recording media such as optical discs via finely condensed optical beams.

Its fundamental recording mechanism is briefly described as follows. For example, in the case of recording information onto an optical disc made of phase changing material, light with power relatively higher than the light irradiated in the case of reproducing information is irradiated onto the optical disc. The light irradiation induces a phase change in the material of the recording surface to create areas having different indexes of reflection, with the result that information is recorded or erased. Further, at the time of reproduction, light in an amount small enough not to induce the phase change is irradiated onto the optical disc. The reproduction of information is performed by detecting the change in the index of reflection of the irradiated light.

The recording and reproduction operations described above exclusively depend on their optical system. Basic functions of the optical head device, which is a main constituent element of the optical system, are roughly categorized into a converging function of forming minute spots of a diffraction limit by use of the light emitted from the light source, a focus control and tracking control function for the optical system, and a function of detecting pit signals. These functions are realized, in accordance with their individual purposes and applications, in combination of various optical systems and photoelectric conversion detecting methods.

One element constituting the basis of the optical system is a light source. In general, a semiconductor laser is preferable as a light source for collecting light up to its diffraction limit. In an optical head device, a small-sized semiconductor laser is mainly used as a light source. In order to perform recording and reproduction with high reliability, the semiconductor laser to be used as a light source of the optical head is naturally required to have low noises.

Semiconductor lasers are roughly categorized into two types: a single-mode laser and a multi-mode laser. Among them, the single-mode laser has a problem that the wavelength of its emitting light is discretely changed due to the influence of the light returned from the optical disc and the like (referred to as a mode hop), and the change in the light amount accompanying the wavelength change is contained in the recording and reproducing signal as a noise. If the semiconductor laser is of a type that is largely influenced by the returned light, a large influence also appears on its laser oscillation itself. In this case, its oscillation may be unstable and its output may largely vary. In this state as it is, the recording and reproduction are also unstable, resulting in poor signal quality.

On the other hand, the multi-mode laser emits light with plural wavelengths from the beginning, and is little influenced by noises caused by a mode hop, and therefore, is excellent as a light source for use in an optical head. However, it is difficult to constitute a multi-mode laser for some desired wavelengths and there are some cases where a desired wavelength is obtainable only in a single-mode laser. Further, depending on environmental conditions such as high temperature, the operation of the multi-mode laser may be unstable and its operation mode may change into a single mode.

In an attempt to solve such a problem, a method in which high frequency superimposing is applied to a single-mode laser to change it into a multi-mode laser and the thus-formed laser is used as a multi-mode laser is employed. Specifically, alternating current components at several hundreds MHz frequency obtained from an oscillating circuit of a high-frequency superimposed circuit are superimposed onto a laser driving current to allow the laser to operate in a multi-mode. In this manner, a practical light source affected by a suppressed level of the returned light and having a low noise is realized.

FIG. 19 is a block diagram showing a structure of a conventional semiconductor laser driving device constituted as described above. A semiconductor laser driving device 150 includes a semiconductor laser 61, a photodetecting element 62, a high-frequency superimposing circuit 72, a laser driving circuit 64, and a high-frequency superimposing control circuit 65. Further, the high-frequency superimposing circuit 72 includes an oscillating circuit 63, a driving power source 66, and a capacity element 70. The laser driving circuit 64 supplies a driving current Id to the semiconductor laser 61. The semiconductor laser 61 emits light when the driving current Id flows into it. The semiconductor laser 61 is a single-mode laser. The photodetecting element 62 receives a part of the light emitted from the semiconductor laser 61 and performs photoelectrical conversion to the received light, thus outputs an electric signal Vs which is a light intensity detecting signal proportional to the light amount (light intensity). The laser driving circuit 64 monitors the electric signal Vs supplied from the photodetecting element 62, and controls the driving current Id in such a manner that the electric signal Vs takes a constant value. By the employment of the structure described above, the semiconductor laser driving device 150 can allow the semiconductor laser 61 to emit light at a desired output level.

The high-frequency superimposing circuit 72 is a circuit for superimposing a high-frequency signal Uf onto the driving current Id. The oscillating circuit 63 oscillates by receiving the supply of electric power from the driving power source 66. The high-frequency signal Uf that the oscillating circuit 63 outputs is transmitted to the path of the driving current If via the capacity element 70 that cuts off the direct current components. At this time, by properly setting the oscillating amplitude and frequency of the oscillating circuit 63, the semiconductor laser 61 is enabled to operate as a multi-mode laser. As a result of this, the noise of the semiconductor laser 61 caused by the returned light can be suppressed, and stable reproduction of the information from the optical disc can be performed.

At this time, the change in the light emitted from the semiconductor laser 61 with respect to time is represented by the solid curve 51 in FIG. 20, for example. As is exemplarily illustrated in FIG. 20, the intensity of the emitted light contains alternating current components having a frequency that corresponds to the frequency of the high-frequency signal Uf outputted by the high-frequency superimposing circuit 72 due to the influence of the high-frequency superimposing. However, if the frequency of the high-frequency signal Uf is set to a value sufficiently higher than the frequency band of the reproducing signal of the optical recording medium, by properly selecting the frequency characteristics of the photodetector that detects the reproducing signal, it is possible to obtain a signal that is the same signal as of the case where reproduction is performed by the laser beam having only the direct current components of the magnitude same as an average value in terms of time shown by a wave line 53. The photodetecting element 62, due to its frequency characteristics, outputs a time average value shown by the broken line 53 as the electric signal Vs.

However, in the structure described above, the peak value 52 of the light amount is higher than the average value of the light amount. For this reason, the power of the laser beam is larger than the average value during a very short period of time. Therefore, if the reproduction of information is performed by irradiating the light emitted from the semiconductor laser 61 onto the optical disc, although the detected reproducing signal is the same as the signal detected by the emitted light having a power of the average value, there arise some cases where the optical disc may cause phase change although it is a small change. This is equivalent to overwrite or erase information during reproducing the information even if the overwritten or erased portion is slight. As a result, the original information recorded on the optical disc deteriorates.

Japanese Unexamined Patent Publication No. 2001-352124 discloses, in order to solve the problem that the frequency of the high-frequency signal varies as the element constant of the circuit element of the semiconductor laser driving device varies with the change in the temperature, a technology that has enabled variable control of the frequency. However, although the conventional technology disclosed in this Reference overcomes the deviation in the frequency of the high-frequency signal, it does not overcome the problem of the deterioration in the information caused by the above-described peak power of the emitted light.

As described above, the conventional semiconductor laser driving device has a problem that there may be a case where deterioration in the information recorded on the optical recording medium is introduced by the peak power of the emitted light.

SUMMARY OF THE INVENTION

An objective of the present invention is to provide a semiconductor laser driving device, an optical head device, an optical information processing device, and an optical recording medium that enable reproduction of information recorded in the optical recording medium without causing deterioration in the information.

According to an aspect of the present invention, a semiconductor laser is driven by a driving signal in such a manner that an average value of an electric signal corresponding to a light amount emitted from the laser coincides with a given target value. A high-frequency signal is superimposed over the driving signal. The amplitude of the high-frequency signal is controlled in such a manner that a peak-to-average ratio of a peak value of the electric signal with respect to the average value of the electric signal does not increase above a given first reference value.

The objectives, characteristics, aspects, and advantages of the present invention will be clearer from the following detailed description and the accompanied drawings.

DETAILED DESCRIPTION OF THE PREFERRED EMBODIMENT OF THE INVENTION

First Embodiment

Figure 1:
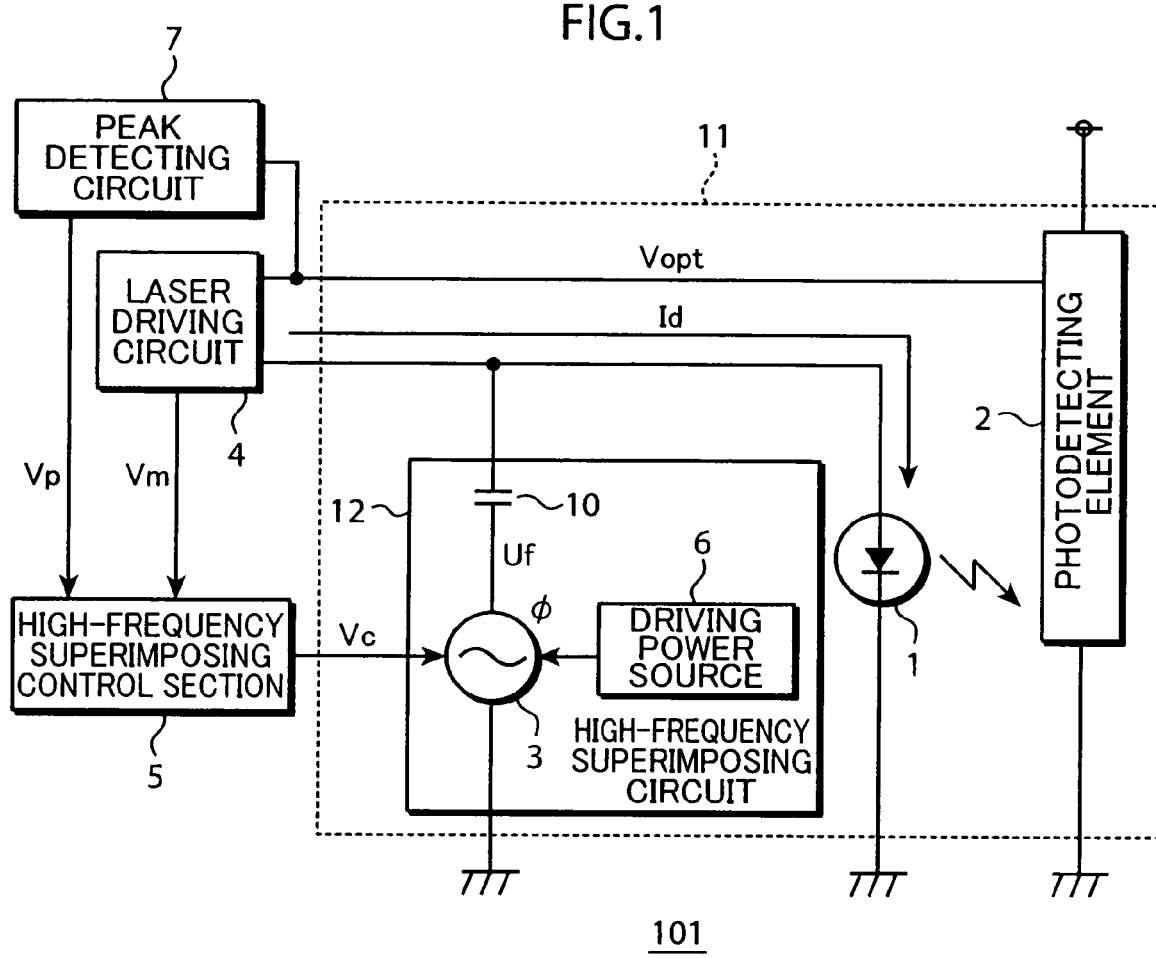
FIG. 1 is a block diagram showing a structure of a semiconductor laser driving device according to a first embodiment of the present invention.

FIG. 1 is a block diagram showing a structure of a semiconductor laser driving device according to a first embodiment of the present invention. A semiconductor laser driving device 101 includes a semiconductor laser 1, a photodetecting element 2, a high-frequency superimposing circuit 12, a laser driving circuit 4, a high-frequency superimposing circuit 5, and a peak detecting circuit 7. Further, the high-frequency superimposing circuit 12 includes an oscillating circuit 3, a driving power source 6, and a capacity element 10. The semiconductor laser 1, the photodetecting element 2, and the high-frequency superimposing circuit 12 belong to a main section 11, whereas the laser driving circuit 4, the high-frequency superimposing control section 5, and the peak detecting circuit 7 belong to a peripheral circuit. As will be described later, whereas the semiconductor laser driving device 101 is used in the state of being incorporated into the optical head device, the peripheral circuit is provided on a fixed circuit board in some cases, apart from the optical system that moves along the tracks of the optical recording medium.

The laser driving circuit 4 supplies a driving current Id to the semiconductor laser 1. The semiconductor laser 1 emits light when the driving current Id flows therein. The semiconductor laser 1 is, for example, a single-mode laser that emits light having a wavelength of 450 nm.

The high-frequency superimposing circuit 12 is a circuit for superimposing a high-frequency signal Uf over the driving current Id. The high-frequency signal Uf is, for example, a current signal. The oscillating circuit 3 oscillates at high frequencies of about 200 MHz to 600 MHz, for example, upon receiving the supply of electric power from the driving power source 6. The high-frequency signal Uf that the oscillating circuit 3 outputs is transmitted to the path of the driving current Id via the capacity element 10 that cuts off the direct current components to realize an AC coupling. When inputted into the semiconductor laser 1, the high-frequency superimposed driving-current Id allows the semiconductor laser 1, which is a single-mode laser, to emit light as a multi-mode laser. As a result, the influence of the returned light from the optical recording medium onto the optical disc, etc. can be reduced and the noise in the semiconductor laser 1 can be suppressed, thereby stably reproducing information from the optical recording medium.

Whereas a major part of the light emitted from the semiconductor laser 1 is directed to the optical recording medium for a recording or reproducing operation, a part thereof is received by the photodetecting element 2. The photodetecting element 2 receives a part of the light emitted from the semiconductor laser 1 and executes photoelectric conversion to thus-received light, so as to output an electric signal Vopt which is a light intensity detecting signal proportional to the light amount (light intensity). The laser driving circuit 4 captures the electric signal Vopt supplied from the photodetecting element 2 and controls the driving current Id in such a manner that an average value Vm of the electric signal Vopt is kept at a constant value. As a result, the average value of the power of the light emitted from the semiconductor laser 1 is kept at constant. By the employment of the structure described above, the semiconductor laser driving device 101 can allow the semiconductor laser 1 to emit light at a desired output level.

At the time of recording information onto the optical recording medium, the semiconductor laser driving device 101 records the information by increasing its light amount to induce a phase change in the recording layer of the optical recording medium made of a phase changing material, for example. In this case, the laser driving circuit 4 increases its light amount by increasing the driving current Id.

Figure 2:
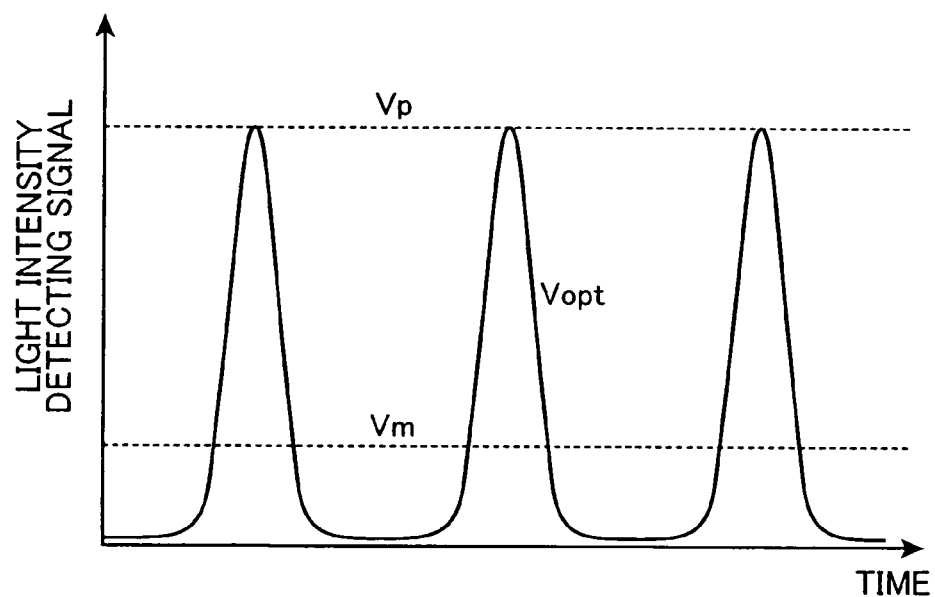
FIG. 2 is a graph illustrating a waveform of the output from the photodetecting element of FIG. 1.
Figure 20:
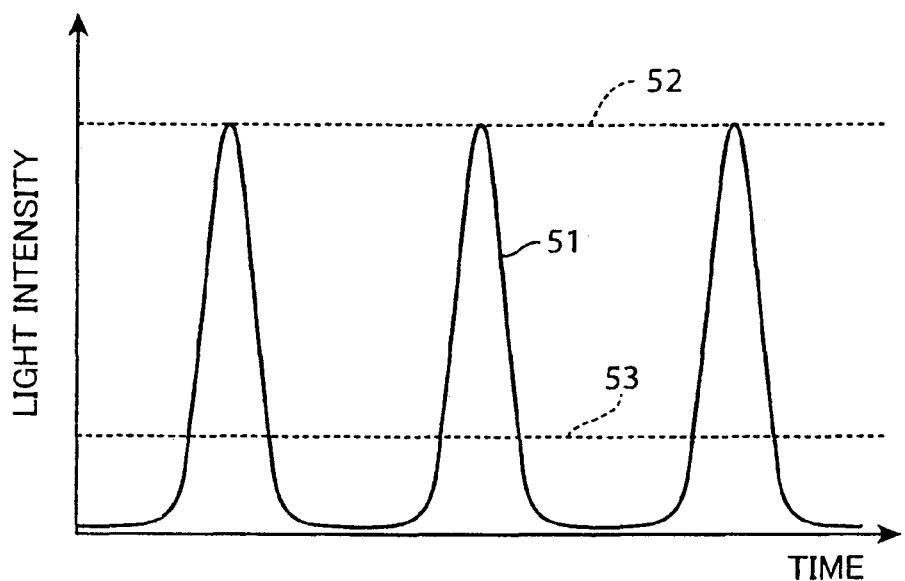
FIG. 20 is a graph illustrating a waveform of the light intensity of the light emitted from the semiconductor laser of FIG. 19.

The change in the intensity of the light emitted from the semiconductor laser 1 with respect to the time is illustrated by the solid curve of FIG. 20. Further, the waveform of the electric signal Vopt that is a light intensity detecting signal obtained from the photodetecting element 2 is illustrated by the solid curve of FIG. 2. As is understood in comparison between FIGS. 2 and 20, the photodetecting circuit 2 precisely detects the change in the time of light intensity. Specifically, by setting the response band of the photodetecting element 2 to be sufficiently high with respect to the frequency of the high-frequency signal Uf, the electric signal Vopt that the photodetecting element 2 outputs can precisely represent the waveform of the light emitted from the semiconductor laser 1.

Figure 3:
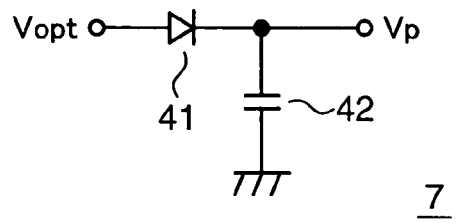
FIG. 3 is a circuit diagram showing an exemplary structure of the peak detecting circuit of FIG. 1.

Therefore, it is also possible to detect from the electric slight intensity signal Vopt not only an average value 53 of the light intensity but also a peak value 52 thereof. The laser driving circuit 4 calculates from the electric signal Vopt its average value Vm and controls the driving current Id in such a manner that the average value Vm is at a predetermined value. On the other hand, the peak detecting circuit 7 detects from the electric signal Vopt its peak value Vp. FIG. 3 is a circuit diagram showing an example of the circuit structure of the peak detecting circuit 7. In the example illustrated in FIG. 3, the peak detecting circuit 7 includes a diode 41 and a capacity element 42, thereby constituting a so-called wave detecting circuit or peak hold circuit.

Figure 4:
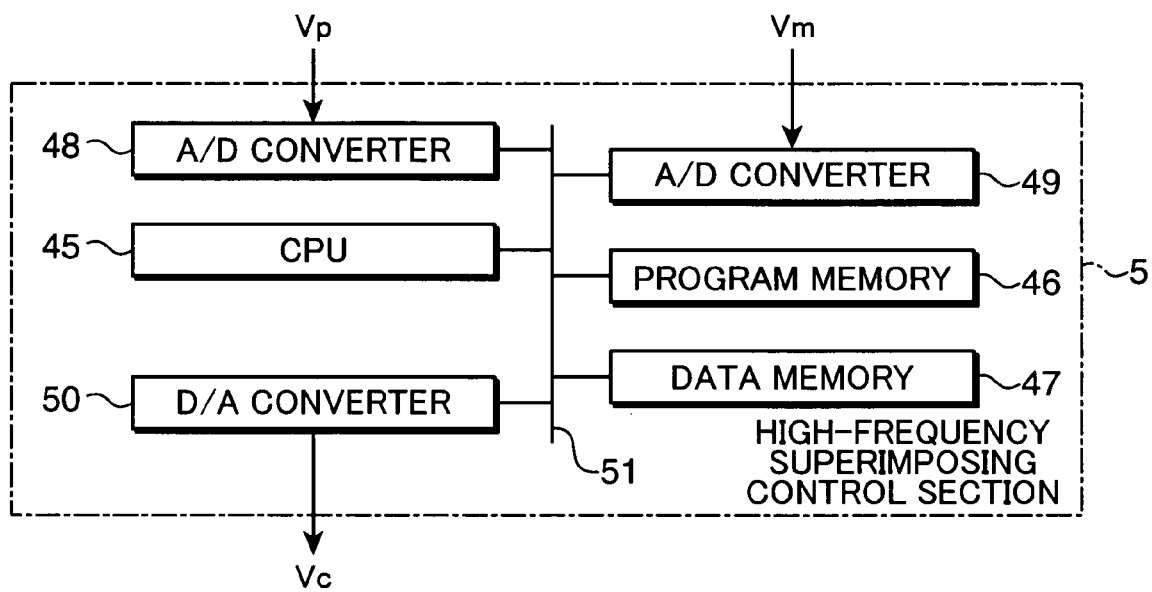
FIG. 4 is a block diagram showing a hardware structure of the high-frequency superimposing control section of FIG. 1.

FIG. 4 is a block diagram showing a hardware structure of the high-frequency superimposing control section 5. The high-frequency superimposing control section 5 includes a CPU (central processing unit) 45, a program memory 46, a data memory 47, A/D converters 48, 49, and a D/A converter 50, and these circuitry elements are connected with each other via a bus line 51. Specifically, the high-frequency superimposing control section 5 is constituted as a microcomputer.

The A/D converter 48 receives the peak value Vp of the electric signal Vopt that the peak detecting circuit 7 outputs, and converts the form of the peak value Vp from analog to digital. The A/D converter 49 receives the average value Vm of the electric signal Vopt that the laser driving circuit 4 acquires, and converts the form of the average value Vm from the analog form into a digital form. The program memory 46 includes a ROM (Read Only Memory) for example, and stores programs and data that define the operations of the CPU 45. The data memory 47 includes a RAM (Random Access Memory) for example, and temporarily stores various kinds of data that accompany the operations of the CPU 45. The CPU 45 calculates control signal Vc to control an amplitude $\phi$ of the high-frequency signal Uf that the high-frequency superimposing circuit 12 outputs, based on the peak value Vp and the average value Vm. The D/A converter 50 converts the form of the control signal Vc from digital to analog. The control signal Vc after being converted into a digital form is inputted into the high-frequency superimposing circuit 12.

Figure 5:
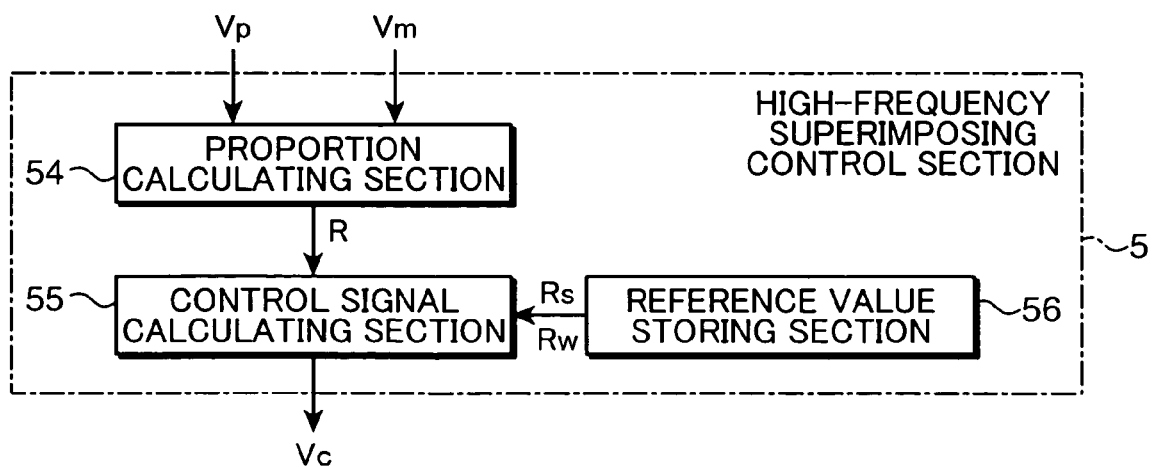
FIG. 5 is a block diagram showing a structure based on the function of the high-frequency superimposing control section of FIG. 1.

FIG. 5 is a block diagram showing a structure based on the function of the high-frequency superimposing control section 5. The high-frequency superimposing control section 5 includes a proportion calculating section 54, a control signal calculating section 55, and a reference value storing section 56. The proportion calculating section 54 receives the peak value Vp and the average value Vm, and calculates the peak-to-average ratio R=Vp/Vm. The reference value storing section 56 stores a first reference value Rs that is an upper limit of the peak-to-average ratio R properly set within the range in which no deterioration arises in the information recorded on the optical recording medium caused by the peak power of the light emitted from the semiconductor laser 1. The reference value storing section 56 stores a reference value Rs into the program memory 46 as a part of programs or a part of data. The control signal calculating section 55 produces a control signal Vc in such a manner that the peak-to-average ratio R calculated by the proportion calculating section 54 does not take a high value exceeding the reference value Rs. The optimum value of the first reference value Rs is, although it differs depending on the characteristics of the optical recording medium such as an optical disc, etc. and the characteristics of the optical system, for example, the peak value Vp: the average value Vm=7.7:1, Rs=7.7.

As described above, the amplitude $\phi$ is controlled in such a manner that the peak-to-average ratio R is equal to or smaller than the first reference value Rs. This enables prevention of the peak power of the light emitted from the semiconductor laser 1 from increasing to an unnecessarily large level. In this manner, at the time of reproducing the information from the optical recording medium, it is possible to keep the amplitude $\phi$ of the high-frequency signal Uf superimposed onto the driving current Id to the range in which the no deterioration arises in the information (recorded signal) recorded on the optical recording medium. Particularly, since the peak-to-average ratio R is calculated based on the peak value Vp detected by the peak detecting circuit 7, even when the semiconductor lasers 1 have different relationships between the amplitude $\phi$ of the high-frequency signal Vf and the peak value Vp of the electric signal from each other, it is possible to prevent deterioration in the recording signal at the time of reproducing information from the optical disc 26.

In general, the peak-to-average ratio R can be expressed as a function $R=f(Vm, T, \phi)$ of the average value Vm, the temperature T of the semiconductor laser 1 and the amplitude $\phi$ of the high-frequency signal Uf. The shape of the function f may vary according to the difference in the characteristics of individual semiconductor lasers 1. If the average value Vm and the amplitude $\phi$ are constant, the peak-to-average ratio R increases as the temperature T of the semiconductor laser 1 increases. Therefore, the high-frequency superimposing control section 5 controls the amplitude $\phi$ in such a manner that the amplitude $\phi$ decreases as the temperature T increases.

Figure 6:
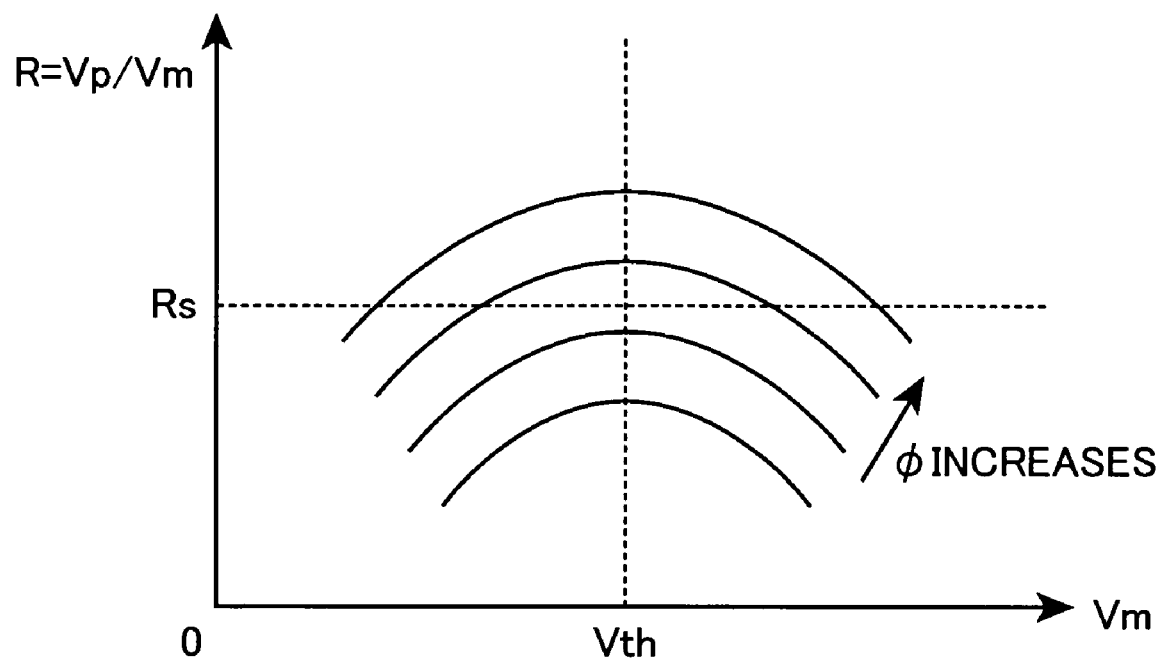
FIG. 6 is a graph illustrating a relationship between a peak-to-average ratio and an average value.

Further, when the output of the semiconductor laser 1 varies, in a range where the power to be output is less than a certain threshold value, the peak value Vp increases as the power increases, whereas in a range where the power is larger than the threshold value, the peak value Vp decreases as the power increases. Specifically, the relationship of the peak-to-average ratio R, the average value Vm, and the amplitude $\phi$ established at a constant temperature is illustrated in the graph of FIG. 6. The average value Vm corresponds to the power of the semiconductor laser 1. The curve depicted by taking the peak-to-average ratio R=Vp/Vm in a longitudinal axis and the average value Vm in a horizontal axis is a hill-shaped curve that takes the maximum value at the threshold value Vth related to the average value Vm. The curve shifts in a forward direction along the longitudinal axis as the amplitude $\phi$ increases.

As has already been described above, the high-frequency superimposing control section 5 controls the amplitude $\phi$ in such a manner that the peak-to-average ratio R is equal to or lower than the first reference value Rs. Therefore, the high-frequency superimposing control section 5 controls the amplitude $\phi$ in such a manner that, as the power or the average value Vm of the semiconductor laser 1 increases, the amplitude $\phi$ decreases if the average value Vm is less than the threshold value Vth and that the amplitude $\phi$ increases if the average value Vm is larger than the threshold value Vth.

Preferably, the reference value storing section 56 stores, on top of the first reference value Rs, a second reference value Rw that is set to a value equal to or lower than the first reference value Rs. The second reference value Rw is a lower limit value of the peak-to-average ratio R that is properly set within the range where the semiconductor laser 1 is stably operable in a multi-mode. The reference value storing section 56 stores the reference value Rw together with the reference value Rs into the program memory 46 as a part of programs or a part of data.

In this case, the control signal calculating section 55 produces a control signal Vc in such a manner that the peak-to-average ratio R calculated by the proportion calculating section 54 does not decrease below the second reference value Rw. Specifically, in this case, the high-frequency superimposing control section 5 controls the amplitude $\phi$ in such a manner that the peak-to-average ratio R satisfies the relationship of $Rw \leq R \leq Rs$. In this manner, it becomes possible to allow the semiconductor laser 1 to stably operate in a multi-mode.

In general, the light emitted from the semiconductor laser 1 may have any wavelength $\lambda$; however, it is desirable that it has a wavelength satisfying the relationship of 390 nm<$\lambda$<420 nm that substantially corresponds to the blue-color area. This is because, in this wavelength area, the peak-to-average ratio R increases to a high value depending on the amplitude $\phi$ of the high-frequency signal Vf. Further, the optical recording medium such as the optical disc 26, etc. employing this wavelength area has a high recording density and is largely influenced by the signal deterioration caused by the peak power.

Second Embodiment

Figure 7:
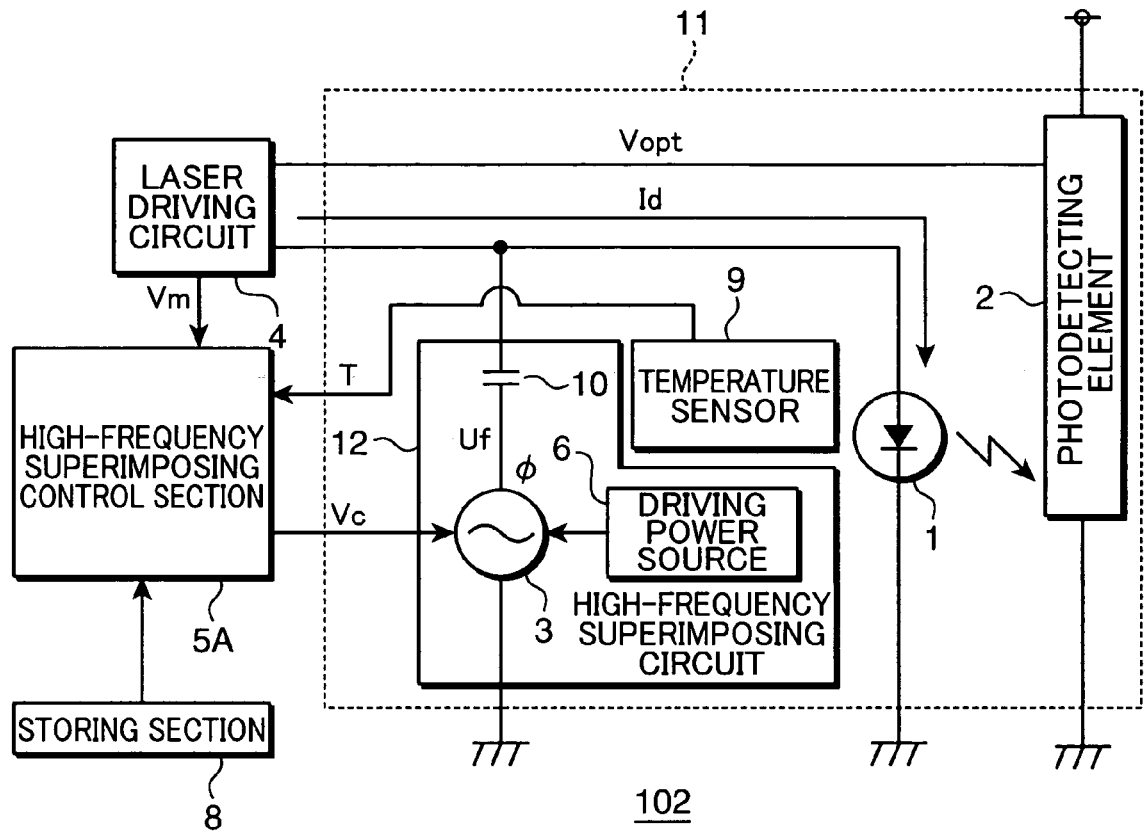
FIG. 7 is a block diagram showing a structure of a semiconductor laser driving device according to a second embodiment of the present invention.

FIG. 7 is a block diagram showing a structure of a semiconductor laser driving device according to a second embodiment of the present invention. A semiconductor laser driving device 102 differs from the semiconductor laser driving device 101 in that it includes a temperature sensor 9 and a storing section 8; the high-frequency control section 5 is substituted by a high-frequency control section 5A; and the peak detecting circuit 7 is eliminated. In the following drawings, the same constituent elements of FIGS. 1 to 5 are denoted by the identical reference numerals and their detailed descriptions will be omitted.

The temperature sensor 9 measures the temperature T of the semiconductor laser 1, and outputs the measured temperature T as an electric signal. Hereinafter, for simplicity of the description, the electric signal that is a measuring signal indicative of the temperature T is also expressed as the temperature T. The storing section 8 includes a semiconductor memory, for example.

Figure 8:
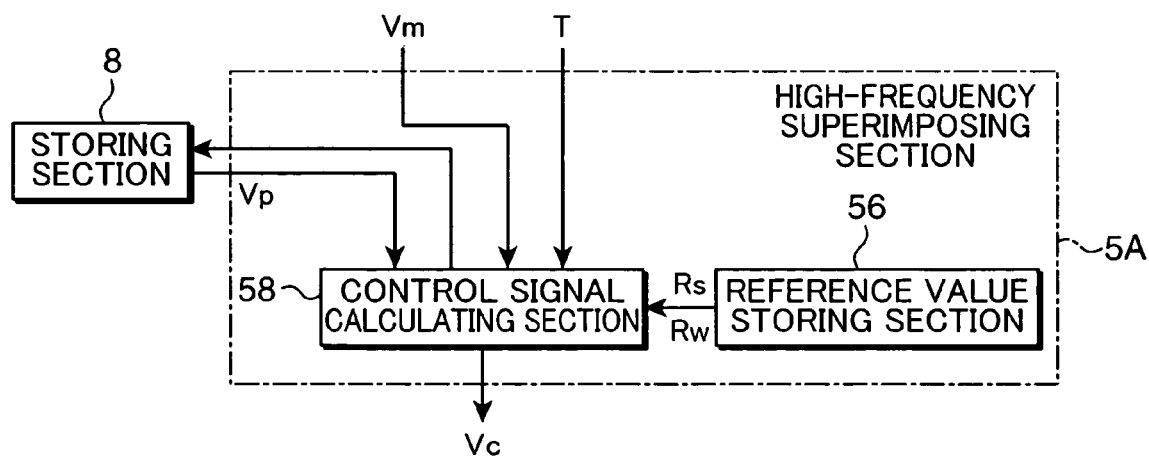
FIG. 8 is a block diagram showing a structure based on the function of the high-frequency superimposing control section of FIG. 7.

The hardware structure of the high-frequency superimposing control section 5A is depicted in the same manner as in FIG. 4, except that the temperature T is inputted into an A/D converter 48 instead of the peak value Vp. FIG. 8 is a block diagram showing a structure based on the function of the high-frequency superimposing control section 5A. The high-frequency superimposing control section 5A includes a control signal calculating section 58 and a reference value storing section 56. The control signal calculating section 58 produces a control signal Vc based on an average value Vm, a temperature T, data stored in the storing section 8, and a first reference value Rs (and preferably also a second reference value Rw) stored in the reference value storing section 56.

Figures 9, 10:
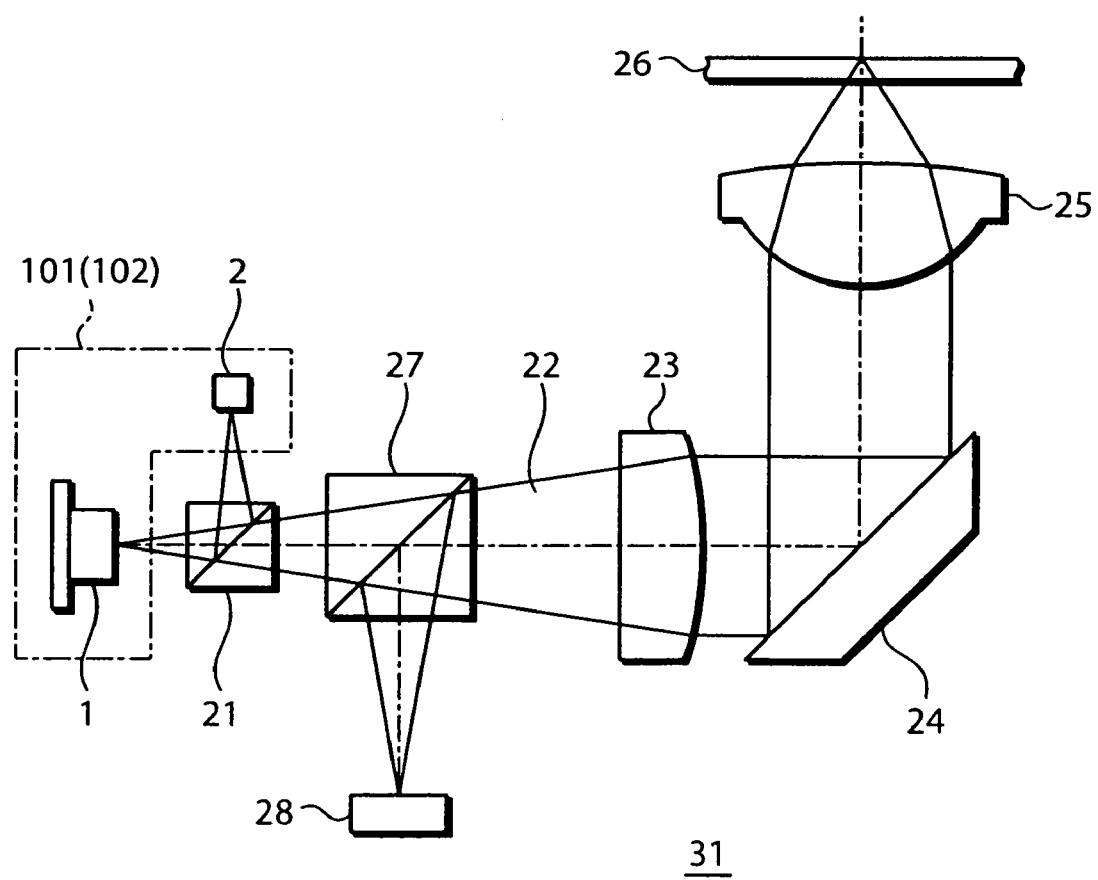
FIG. 9 is an illustrative diagram showing an exemplary structure of the data to be stored into the storing section of FIG. 7.
FIG. 10 is a structural diagram showing a schematic structure of an optical head device according to a third embodiment of the present invention.

As has already been described above, a functional relationship R=f(Vm, T, φ) is established among the peak-to-average ratio R, the average value Vm, the temperature T, and the amplitude φ. The storing section 8 stores the relationship of these variables that have been obtained beforehand in experiments, etc. FIG. 9 is an illustrative diagram illustrating the structure of the data to be stored in the storing section 8. In the example of FIG. 9, the storing section 8 stores a value of the peak-to-average ratio R with respect to various combinations of the average value Vm, the temperature T, and the amplitude φ. Since there is a constant correspondence relationship between the amplitude φ and the control signal Vc, the storing section 8 may store the control signal Vc instead of the amplitude φ, and the amplitude φ and the control signal Vc are substantially equivalent to each other.

The control signal calculating section 58 produces a control signal Vc for realizing an amplitude φ at which the peak-to-average ratio R does not increase exceeding the first reference value Rs. The control signal calculating section 58 reads out from the storing section 8, for example, an amplitude φ that corresponds to the combination of the received average value Vm and the temperature T, and the peak-to-average ratio R equivalent to the first reference value Rs stored in the reference value storing section 56. The control signal calculating section 58 produces a control signal Vc in such a manner that the amplitude φ does not increase above the read amplitude φ.

As described above, the high-frequency superimposing control section 5A compares the temperature T obtained from the temperature sensor 9 and the average value Vm obtained in the laser driving circuit 4 that has received the electric signal Vopt from the photodetecting element 2 with the data stored in the storing unit 8, so as to control the amplitude φ in such a manner that the peak-to-average ratio R does not increase exceeding the first reference value Rs. With this arrangement, the semiconductor laser driving device 102 does not need the peak detecting circuit 7, and realizes the control over the amplitude φ of the high-frequency signal Vf taking into consideration the change in the temperature of the semiconductor laser 1. Further, since the photodetecting element 2 is not needed to detect the peak value of the light emitted from the semiconductor laser 1, the photodetecting element 2 may be an element having a relatively low frequency band.

In the case where the reference value storing section 56 also stores the second reference value Rw, the control signal calculating section 58 reads out from the storing section 8, for example, even the amplitude φ that corresponds to the combination of the received average value Vm and the temperature T, and the peak-to-average ratio R equivalent to the second reference value Rw, and may produce a control signal Vc in such a manner that the amplitude φ does not decrease below the read amplitude φ. In this manner, the high-frequency superimposing control section 5A can control the amplitude φ in such a manner that the peak-to-average ratio R does not decrease below the second reference value Rw, and can allow the semiconductor laser 1 to stably operate in a multi-mode.

Third Embodiment

FIG. 10 is a structural diagram showing a schematic structure of an optical head device according to a third embodiment of the present invention. The optical head device 31 includes the semiconductor laser driving device 101 shown in FIG. 1 or the semiconductor laser driving device 102 shown in FIG. 7, a beam splitter 21, for a front light monitor, a beam splitter 27, a photodetector 28, a condensing lens 23, a stand-up mirror 24, and an objective lens 25. The beam splitter 21 for a front light monitor separates a part of the outward light and allows it to enter the photodetecting element 2. The beam splitter 27 separates the outward light from the returning light, and allows it to enter the photodetector 28.

At the time of reproducing the information recorded on the optical disc 26, a laser beam 22 having a wavelength 405 nm emitted from the semiconductor laser 1 is turned into a parallel beam by the condensing lens 23, and its light path is folded by the stand-up mirror 24, and then the beam enter the objective lens 25. A part of the emitted light is separated by the beam splitter 21 for a front light monitor in the course of its outward path, and the part of the separated light enters the photodetecting element 2. The light entered the objective lens 25 is condensed onto the optical disc 26. The light reflected by the optical disc 26 returns along the course reversal to the outward path from the objective lens, the stand-up mirror 24, and the condensing lens 23, and is reflected by the beam splitter 27 so as to enter the photodetector 28. The photodetector 28 performs photoelectric conversion to the entered light, and detects it as an electric signal. The electric signal detected as a result of the photoelectric conversion in the photodetector 28 is used as a reproducing signal for the pit rows on the optical disc 26 or a servo signal for tracing the pit rows thereof, as will be described later.

The recording operation of the optical head device 31 is basically the same as its reproducing operation, except that the amount of light emitted from the semiconductor laser 1 is large and the light in the large light amount performs recording onto the optical disc 26. Since the optical head device 31 includes the semiconductor laser driving device 101 or 102, the optical head device 31 is capable of stable reproduction over a long period of time onto one and the same optical disc 26 without deterioration in the information recorded on the optical disc 26 during the reproduction.

Fourth Embodiment

Figure 11:
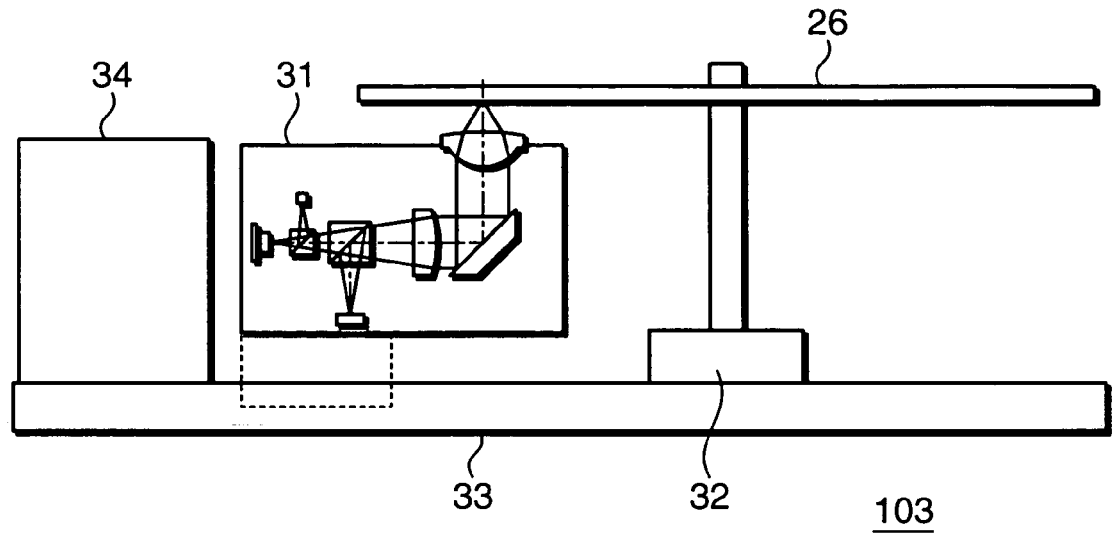
FIG. 11 is a schematic side view of an optical information processing device according to a fourth embodiment of the present invention.
Figure 12:
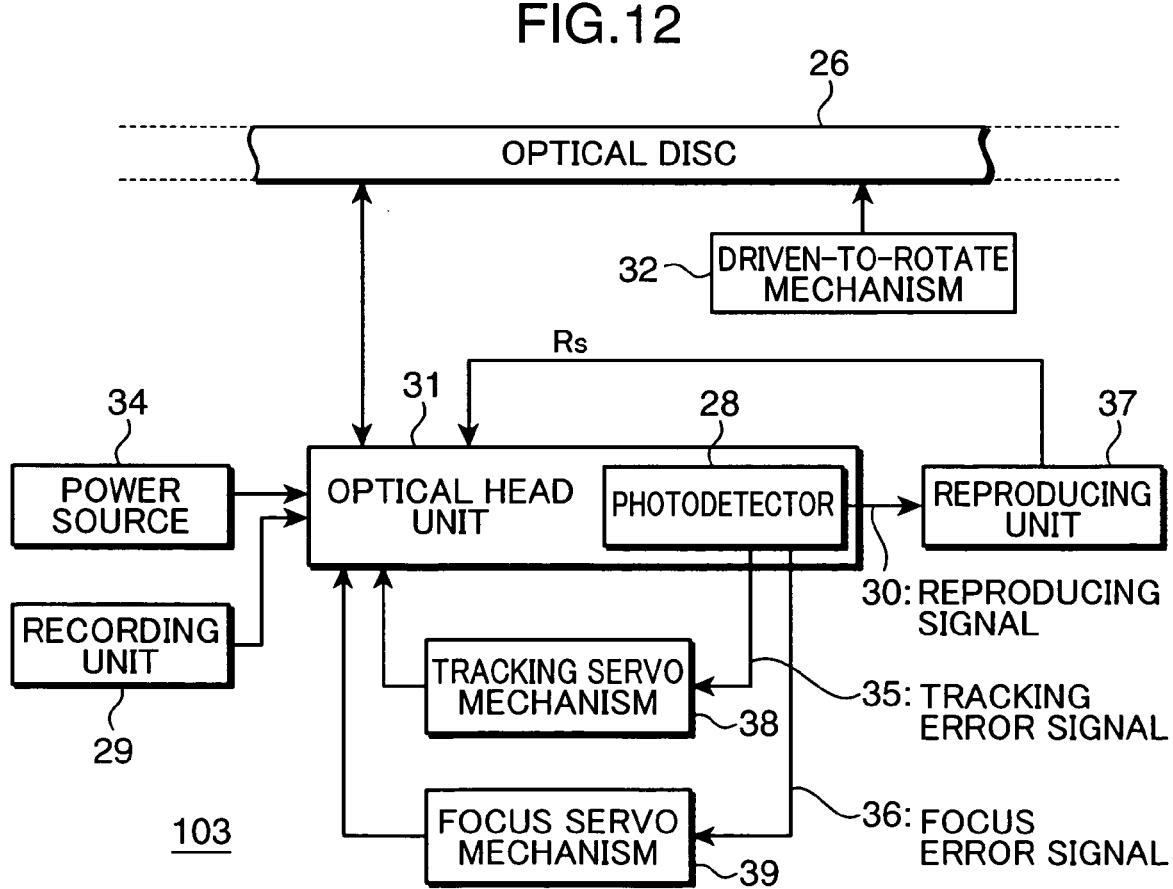
FIG. 12 is a block diagram of the optical information processing device of FIG. 11.

FIG. 11 is a schematic side view of an optical information processing device according to a fourth embodiment of the present invention, and FIG. 12 is a block diagram thereof. The optical information processing device 103 includes, on top of the optical head device 31 shown in FIG. 10, a motor (a driven-to-rotate mechanism) 32, a circuit board 33, a power source unit 34, a recording unit 29, a reproducing unit 37, a tracking servo mechanism 38, and a focus servo mechanism 39. The circuit board 33 includes various circuit elements (not shown), and is one of the constituent elements of the recording unit 29, the reproducing unit 37 the tracking servo mechanism 38, and the focus servo mechanism 39. The motor 32 allows an optical disc 26 to rotate while supporting it.

The optical head device 31 sends the signal corresponding to the positional relationship with the optical disc 26 to the circuit board 33. The circuit board 33 calculates this signal so as to output a signal for slightly moving the optical head device 31 or an optical lens 25 located within the optical head 31. Specifically, the photodetector 28 performs photoelectric conversion to the light that it has received so as to generate a reproducing signal 30, a tracking error signal 35, and a focus error signal 36. The tracking servo mechanism 38 controls, based on the tracking error signal 35, the optical head device 31 or the optical lens 25 in such manner to compensate for the tracking error. Similarly, the focus servo mechanism 39 controls, based on the focus error signal 36, the optical head device 31 or the objective lens 25 in such a manner to compensate for the focus error. As a result, the optical head device 31 becomes capable of reading, writing, or erasing information onto the optical disc 26.

The reproducing unit 37 reproduces, based on the reproducing signal 30, the information recorded on the optical disc 26. The reproducing unit 37 reproduces, based on the reproducing signal 30, information recorded on the optical disc 26, and if the information is image information and sound information, for example, the reproducing unit 37 converts the information into an image signal and a sound signal. The image signal is displayed as an image as a result of being inputted into a monitor (not shown), and the sound signal is outputted as a sound as result of being inputted into a speaker (not shown). The recording unit 29 records information onto the optical disc 26 through the optical head device 31.

In the semiconductor laser driving device 101 or 102 included in the optical head device 31, the peripheral circuit except for the main section 11 (see FIG. 1 or 7) may be incorporated together with the main section 11 into an optical system that is drive-controlled independently from the circuit board 33, or alternatively, may be mounted on the circuit board 33 independently from the main section 11. In the latter case, as is shown by a dotted line in FIG. 11, the optical head device 31 includes both of the drive-controlled section and a part of the circuit board 33.

The power source unit 34 supplies electric power to the circuit board 33, the tracking servo mechanism 38 and the focus servo mechanism 39 which are the driving mechanisms for the optical head device 31 and the objective lens 25, and the motor 32. The power source unit 34 may be substituted by a joint section with an external power source. Alternatively, the power source unit 34, another power source that receives the supply of electric power from the joint section with an external power source, or another joint section may be provided to the individual driving mechanisms or individual circuits.

Since the optical information processing device 103 according to this embodiment employs the optical head device 31 shown in FIG. 10, the optical information processing device 103 never causes deterioration in the information recorded on the optical disc during reproduction and is capable of performing stable reproduction to one and the same optical disc 26 over a long period of time.

Fifth Embodiment

Figure 13:
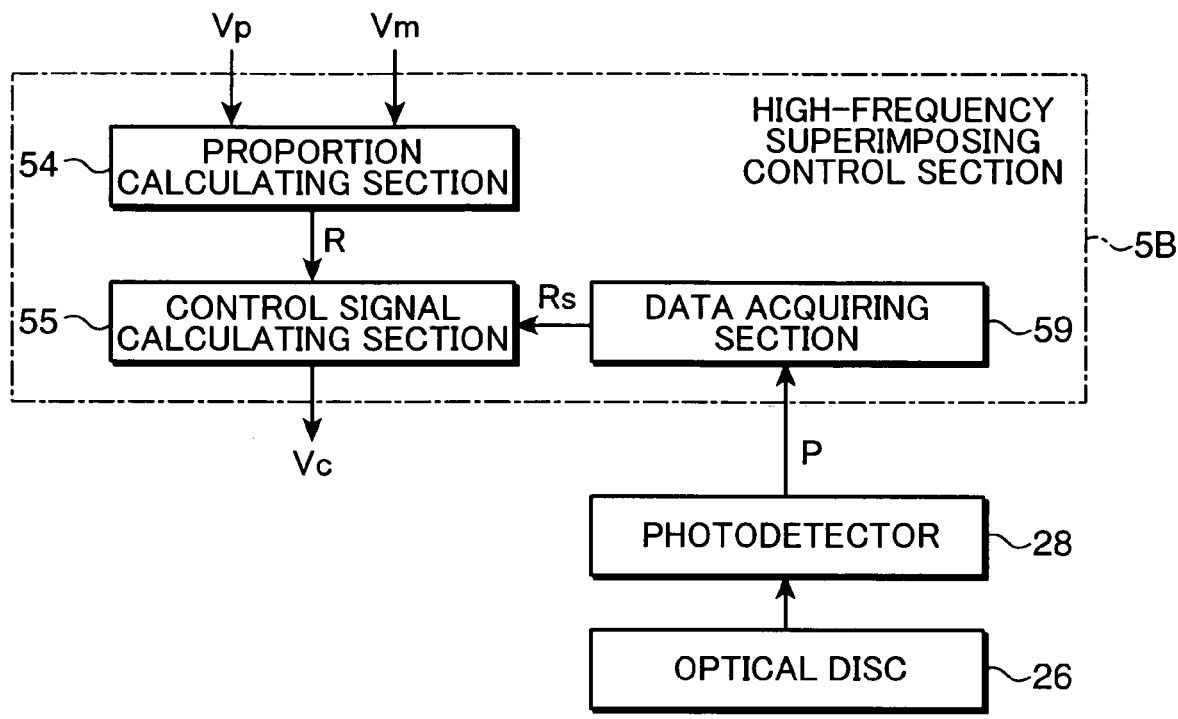
FIG. 13 is a block diagram showing a structure of the high-frequency superimposing control section included in a semiconductor laser driving device according to a fifth embodiment of the present invention.

FIG. 13 is a block diagram showing a structure of the high-frequency superimposing control section included in a semiconductor laser driving device according to a fifth embodiment of the present invention. The structure of the semiconductor laser driving device according to this embodiment is depicted in the same manner as FIG. 1. However, the high-frequency superimposing control section 5 is substituted by a high-frequency superimposing control section 5B of FIG. 13. The hardware structure of the high-frequency superimposing control section 5B is depicted in the same manner as FIG. 4. As shown in FIG. 13, the high-frequency superimposing control section 5B includes a data acquiring section 59, instead of the reference value storing section 56 of the high-frequency superimposing control section 5 shown in FIG. 5. The semiconductor laser driving device according to this embodiment has an assumption that an optical disc 26 to which recording and reproduction of information is to be made records a peak value 52 of the laser beam having a limitation that never causes deterioration in a recording signal, that is, an allowance value P of the peak value 52.

Figure 14:
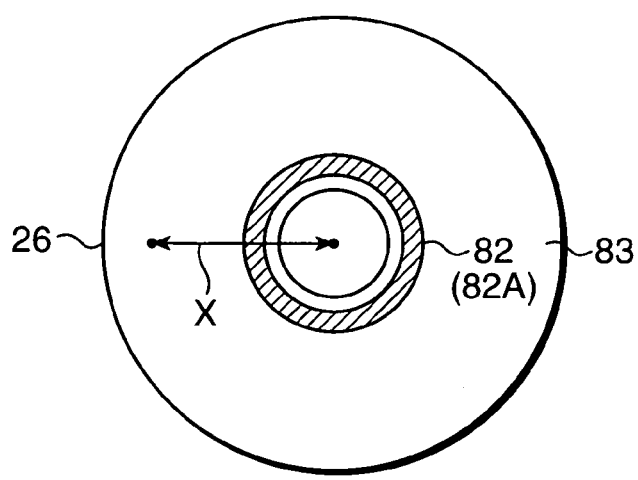
FIG. 14 is a schematic plan view of an optical disc to be used in the semiconductor laser driving device according to a fifth embodiment of the present invention.
Figure 15:
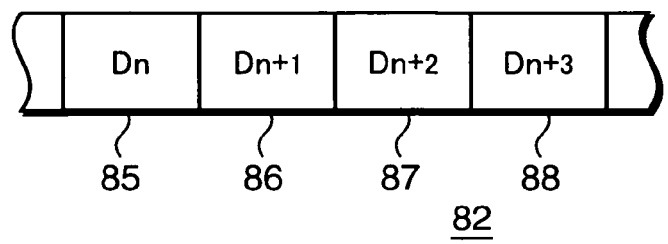
FIG. 15 is a schematic diagram illustrating the data to be recorded into the conditions recording area of FIG. 14.

FIG. 14 is a schematic plan view of the optical disc 26 to which the semiconductor laser driving device makes recording and reproduction according to this embodiment. The optical disc 26 includes, on top of an information recording area 83 for recording normal information, a conditions recording area 82. FIG. 15 is a schematic diagram illustrating the data to be recorded along the tracks of the conditions recording area 82. For example, data 85 is an allowance value P; data 86 is power of laser beam at the time of recording information (mW); data 87 is power of laser beam at the time of erasing information (mW); and data 88 is data representing the manufacturer of the optical disc 26.

Returning to FIG. 13, the data acquiring section 59 reads, via the photodetector 28, the allowance value P recorded on the optical disc 26, and calculates a first reference value Rs from the read allowance value P. Similarly to the high-frequency superimposing control section 5 shown in FIG. 5, a control signal calculating section 55 produces a control signal Vc in such a manner that the peak-to-average ratio R calculated by the proportion calculating section 54 does not increase above the reference value Rs.

As described above, the high-frequency superimposing control section 5B reads the allowance value P recorded on the optical disc 26 to which the reproduction is to be made, and obtains the first reference value Rs from the read allowance value P. Therefore, it becomes possible to perform high-frequency superimposing to the individual optical discs 26 in such a manner that the semiconductor laser 1 emits a laser beam that enables the peak-to-average ratio R to take the optimum value at which no deterioration in the recording signal arises, even in the case where the influence of the peak value 52 of the laser beam exerted onto the optical disc 26 largely differs depending on the individual optical discs 26.

Sixth Embodiment

Figure 16:
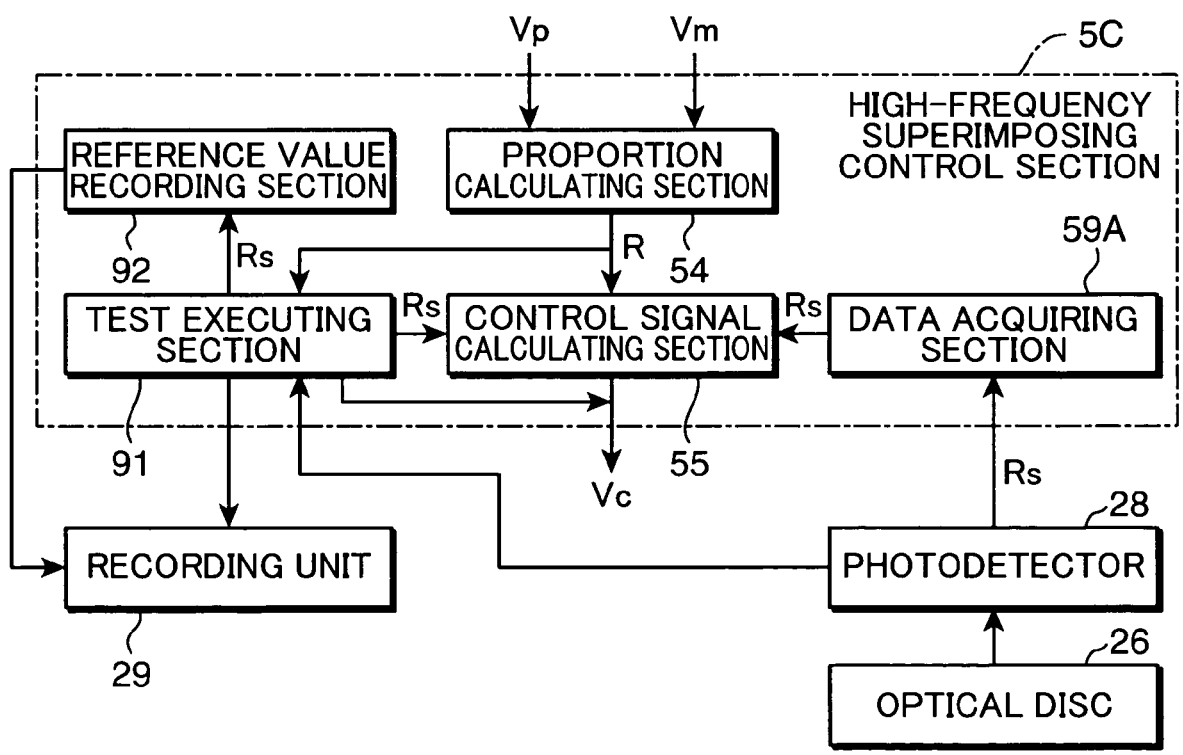
FIG. 16 is a block diagram showing a structure based on the function of the high-frequency superimposing control section of a semiconductor laser driving device according to a sixth embodiment.

FIG. 16 is a block diagram showing a structure based on the function of the high-frequency superimposing control section of a semiconductor laser driving device according to a sixth embodiment. The structure of the semiconductor laser driving device according to this embodiment is depicted in the same manner as FIG. 1. However, the high-frequency superimposing control section 5 is substituted by a high-frequency superimposing control section 5C of FIG. 16. The hardware structure of the high-frequency superimposing control section 5C is depicted in the same manner as FIG. 4.

As is shown in FIG. 16, the high-frequency superimposing control section 5C includes, on top of the proportion calculating section 54 and the control signal calculating section 55 shown in FIG. 13, a test executing section 91 and a reference value recording section 92. Further, the data acquiring section 59 is substituted by a data acquiring section 59A. The semiconductor laser driving device according to this embodiment has an assumption that an optical disc 26 to which recording and reproduction of information is to be made has a test recording area capable of recording test patterns. The test recording area is preferably provided at a position adjacent to the conditions recording area 82 of FIG. 14, for example. For this reason, FIG. 14 illustrates the test recording area denoted by a reference numeral 82A at the position identical to the conditions recording area 82.

The test executing section 91 records test patterns into the test recording area 82A and reads out the test patterns while varying the amplitude φ of the high-frequency signal Vf, so as to judge a first reference value Rs. The reference value recording section 92 records the first reference value Rs judged by the test executing section 91 into the conditions recording area 82 of the optical disc 26 through a recording unit 29. The data acquiring section 59A reads out the first reference value Rs recorded in the reference value recording section 92 from the conditions recording area 82 of the optical disc 26 through an optical detector 28. The control signal calculating section 55 produces a control signal Vc in such a manner that the peak-to-average ratio R calculated by the proportion calculating section 54 does not increase above the reference value Rs judged by the test executing section 91 or the reference value Rs acquired by the data acquiring section 59A.

Figure 17:
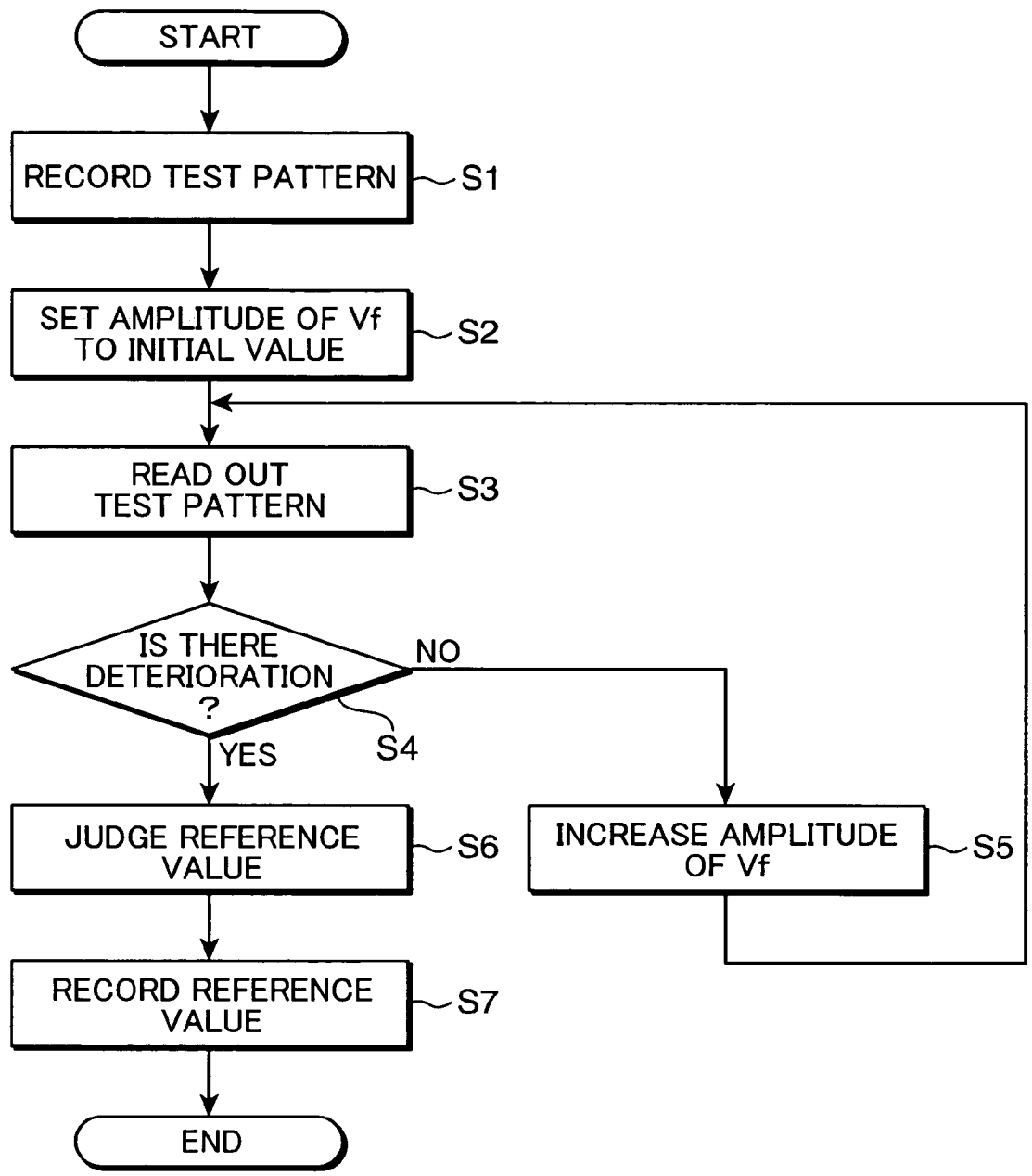
FIG. 17 is a flowchart showing an operation of the high-frequency superimposing control section of FIG. 16.

FIG. 17 is a flowchart showing an operation procedure of the test executing section 91 and the reference value recording section 92 in the high-frequency superimposing control section 5C. When the test executing section 91 initiates a processing, first of all, it records a test pattern into the test recording area 82A of the optical disc 26 through the recording unit 29 (S1). The test pattern may be data representing a numeral value in plural digits or alternatively may be any pit pattern representing no meaning as data, for example. At the time of recording a test pattern, as is the normal operation of recording information, the laser driving circuit 4 increases the driving current Id, so as to increase the output power of the semiconductor laser 1. Next, the test executing section 91 sets the amplitude φ of the high-frequency signal Vf to an initial value (S2). The initial value of the amplitude φ is set to a value small enough not to cause deterioration in the recording signal of the optical disc 26 at the time of reproducing information from the optical disc 26.

Then, the test executing section 91 reads out the test pattern from the test recording area 82 (S3). At the time of reading out the test pattern, as is the normal operation of reproducing information, the laser driving circuit 4 decreases the driving current Id so as to decrease the output power of the semiconductor laser 1.

Subsequently, the test executing section 91 determines whether or not deterioration arises in the read test pattern (S4). The test executing section 91 determines the presence or absence of the deterioration by determining whether not a jitter exceeding a predetermined magnitude appears in the read test pattern, for example. Alternatively, the test executing section 91 determines whether or not deterioration arises by reproducing the data that the read test pattern represents and determining whether or not the reproduced data coincides with the recorded data, for example, coincides with the numeric value in plural digits, for example.

If no deterioration is found (No in S4), the test executing section 91 increases the amplitude φ by one degree (S5), and then returns the processing to Step S3. Specifically, the test executing section 91 repeatedly executes the loop from Steps S3 to S5, so that it determines whether or not deterioration arises in the test pattern while increasing the amplitude φ stepwise.

If the test executing section 91 determines in Step S4 that deterioration arises, it acquires the peak-to-average ratio R of this time from the proportion calculating section 54, and for example, determines that a value smaller than the acquired peak-to-average ratio R to some extent with a margin as a first reference value Rs (S6). The magnitude of the margin may be defined beforehand as a specific width, for example, or alternatively, as a proportion such as a percentage with respect to the acquired peak-to-average ratio R.

Then, the reference value recording section 92 records the first reference value Rs judged by the test executing section 91 into the conditions recording area 82 (S7). Upon completion of this step, the processing by the test executing section 91 and the reference value recording section 92 is terminated. After that, the control signal calculating section 55 produces a control signal Vc based on the first reference value Rs judged by the test executing section 91, and inputs the control signal Vc into the high-frequency superimposing circuit 12.

In the case where reproduction is to be performed again to the optical disc 26 including the first reference value Rs recorded thereon by the reference value recording section 92, the test executing section 91 is not required to allow the test pattern to be recorded again. In this case, the data acquiring section 59A operates instead of the test executing section 91, and reads out the first reference value Rs recorded in the conditions recording area 82 of the optical disc 26. In this case, the control signal calculating section 55 produces a control signal Vc with reference to the reference value Rs acquired by the data acquiring section 59A, instead of the reference value Rs judged by the test executing section 91.

As described above, since the high-frequency superimposing control section 5C includes the test executing section 91, it can properly control the amplitude φ of the high-frequency signal Vf for the individual optical discs 26. Further, since the high-frequency superimposing control section 5C includes the reference value recording section 92 and the data acquiring section 59A, there is no need for the test executing section 91 to perform recording and reading of the test pattern every time reproduction is performed to one and the same optical disc 26.

The reference value recording section 92 may allow the conditions recording area 82 to record, preferably on top of the first reference value Rs, a code for identifying the product type of the semiconductor laser driving device, and more preferably a code for identifying the individual semiconductor laser driving devices. There are some cases where the output characteristics of the laser beams slightly differ depending on the product types of the semiconductor laser driving devices or on the individual products. The arrangement where the optical disc 26 includes the identifying codes together with the first reference value Rs recorded thereon enables the high-frequency superimposing control section 5C to determine whether or not the first reference value Rs recorded on the optical disc 26 is worth reference. If the first reference value Rs is not worth reference, the high-frequency superimposing control section 5C activates the test executing section 91 again to judge the first reference value Rs.

Seventh Embodiment

Figure 18:
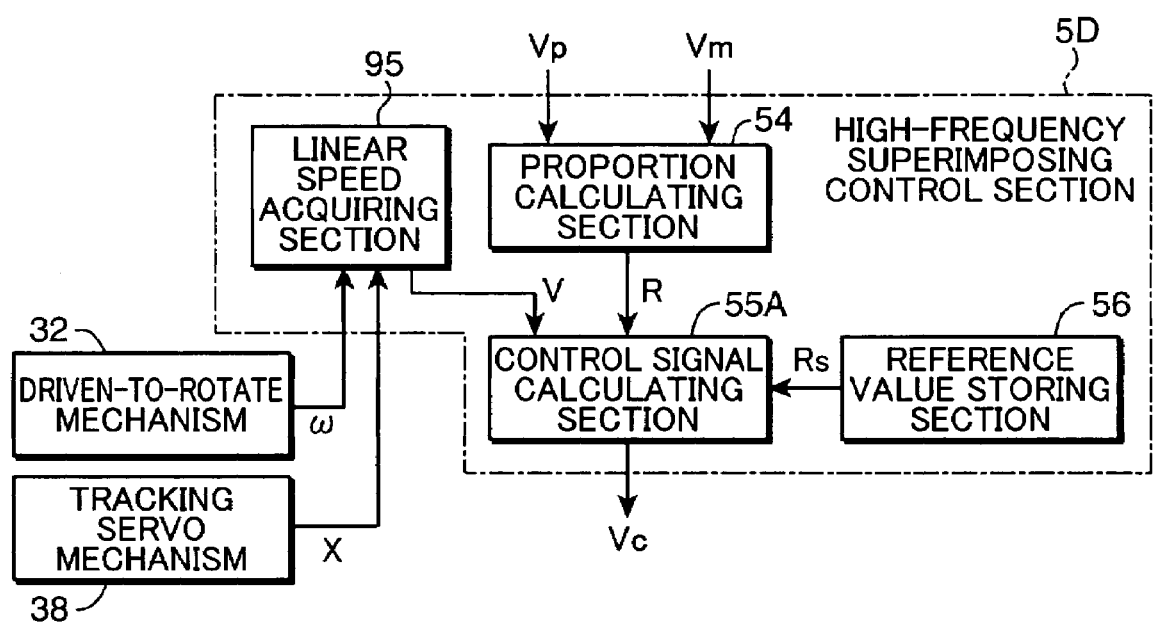
FIG. 18 is a block diagram showing a structure based on the function of the high-frequency superimposing control section of a semiconductor laser driving device according to a seventh embodiment.
Figure 19:
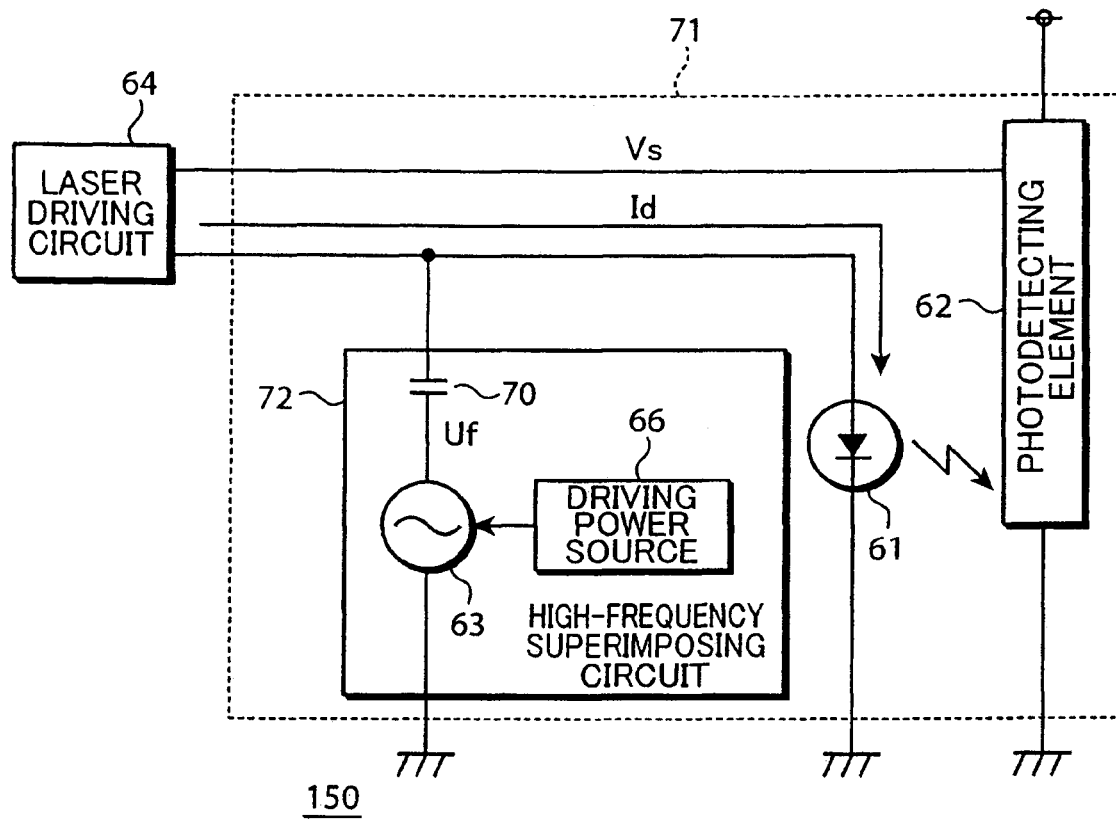
FIG. 19 is a block diagram showing a structure of a semiconductor laser driving device according to a convention technology.

FIG. 18 is a block diagram showing a structure based on the function of the high-frequency superimposing control section of a semiconductor laser driving device according to a seventh embodiment. The structure of the semiconductor laser driving device according to this embodiment is depicted in the same manner as in FIG. 1, except that the high-frequency superimposing control section 5 is substituted by a high-frequency superimposing control section 5D of FIG. 18. The hardware structure of the high-frequency superimposing control section 5D is depicted in the same manner as in FIG. 4.

As is shown in FIG. 18, the high-frequency superimposing control section 5D includes, on top of the proportion calculating section 54 and the reference value storing section 56 shown in FIG. 5, a linear speed acquiring section 95. Further, the control signal calculating section 55 is substituted by a control signal calculating section 55A. The linear speed acquiring section 95 acquires a linear speed V of an optical disc 26 at the time of reproducing information from the optical disc 26. The linear speed acquiring section 45 acquires a rotating speed of the motor ω from a driven-to-rotate mechanism 32, for example, and acquires a position X of the light spot on the optical disc 26 from a tracking servo mechanism 38 (see FIG. 14), and then calculates a linear speed V from the acquired rotating speed ω.

The control signal calculating section 55A produces a control signal Vc in such a manner that the peak-to-average ratio R calculated by the proportion calculating section 54 does not increase above the value obtained by multiplying the reference value Rs stored in the reference value storing section 56 by $\sqrt{(V/Vo)}$ times, and inputs thus-produced control signal Vc into the high-frequency superimposing circuit 12. Here, the Vo indicates a standard linear speed with respect to the optical disc 26.

When the information is recorded or erased on the optical disc 26, the speed on the recording surface relative to the light spot on the recording surface of the optical disc 26, that is, the above-described linear speed is set to a constant speed Vo that is specific to the format of the optical disc 26. This is the standard linear speed Vo described above. However, when there is a need for recording a large quantity of information in a short period of time, it is needed to record the information at a linear speed V higher than the standard linear speed Vo. In this case, the light quantity per unit time of the light entering onto the recording surface decreases, and there is a fear that the recording quality may decrease.

Therefore, in order to perform recording at a quality equivalent to the case of recording at the standard linear speed Vo, it is needed to increase the light quantity per unit time. It is known that the light quantity per unit time for the optical disc 26 made of a phase changing material, for example, should be proportional to the value $\sqrt{(V/Vo)}$. Contrarily, in the case where the recording is performed at the linear speed V set at a low rate satisfying the relationship of V<Vo, it is required to decrease the light quantity per unit time. It is also known that, in such a case as well, the light quantity per unit time should be proportional to the value $\sqrt{(V/Vo)}$.

The phenomenon that the information recording the peak of the light quantity deteriorates at the time of reproducing information from the optical disc 26 is equivalent to the phenomenon that occurs when the information is recorded. Therefore, it can be concluded that the upper limit of the peak value of the light quantity that never causes deterioration in the record information at the time of reproducing the information is proportional to the value $\sqrt{(V/Vo)}$. Since the high-frequency superimposing control section 5D controls the amplitude φ of the high-frequency signal Vf in such a manner that the peak-to-average ratio R is proportional to the value $\sqrt{(V/Vo)}$, the amplitude φ of the high-frequency signal Vf is properly controlled even if the linear speed V of the optical disc 26 varies.

As described above, an inventive semiconductor laser driving device includes: a semiconductor laser; a photodetecting element for receiving a part of light emitted from the semiconductor laser and converting the part of light into an electric signal corresponding to a light amount; a laser driving circuit for inputting a driving signal into the semiconductor laser in such a manner that an average value of the electric signal coincides with a given target value; and a high-frequency superimposing control section for controlling an amplitude of the high-frequency signal, wherein the high-frequency superimposing control section controls the amplitude in such a manner that a peak-to-average ratio that is a ratio of a peak value of the electric signal with respect to the average value of the electric signal does not increase above a given first reference value.

The amplitude of the high-frequency signal may be preferably controlled in such a manner that the peak-to-average ratio that is a ratio of the peak value of the electric signal corresponding to the light amount of the emitted light with respect to the average value does not increase above a given first reference value. Therefore, by properly setting the first reference value, information can be reproduced from an optical recording medium without causing deterioration in the information recorded on the optical recording medium. Due to this, it becomes possible to perform stable reproduction of information from one and the same optical recording medium over a long period of time.

Preferably, the high-frequency superimposing control section may further control the amplitude in such a manner that the peak-to-average ratio does not decrease below a given second reference value equal to or lower than the first reference value. The amplitude of the high-frequency signal is controlled in such a manner that the peak-to-average ratio does not decrease below the given second reference value. Therefore, by properly setting the second reference value, it is possible to allow the semiconductor laser to stably operate in a multi-mode.

Preferably, there may be further provided a peak detecting circuit for receiving the electric signal from the photodetecting element and for detecting the peak value of the electric signal. The high-frequency superimposing control section calculates the peak-to-average ratio based on the peak value detected by the peak detecting circuit. The peak detecting circuit detects the peak value of the electric signal from the photodetecting element. The peak-to-average ratio is calculated based on the peak value detected by the peak detecting circuit. As a result, the amplitude of the high-frequency signal is precisely controlled. Particularly, even in the case where the semiconductor lasers have different relationships between the amplitude of the high-frequency signal and the peak value of the electric signal from each other, it is possible to prevent deterioration in the recording signal at the time of reproducing information from the optical disc, and to perform stable reproduction over a long period of time.

Preferably, there may be further provided a temperature sensor for measuring a temperature of the semiconductor laser; and a storing section for storing data indicative of a relationship of the average value, the temperature, the amplitude, and the peak-to-average ratio. The high-frequency superimposing control section reads out the data from the storing section, so as to control the amplitude based on the data, the average value, and the temperature. The high-frequency superimposing control section reads out data stored in the storing section and indicative of a relationship of the average value of the electric signal, the temperature of the semiconductor laser, the amplitude of the high-frequency signal, and the peak-to-average ratio, and controls the amplitude of the high-frequency signal based on the data, the average value, and the temperature of the semiconductor laser. In this structure, a peak detecting circuit is not needed. Further, the control of amplitude of the high-frequency signal taking into consideration the variation in the temperature of the semiconductor laser is realized.

The high-frequency superimposing control section may preferably control the amplitude in such a manner that the amplitude decreases as the temperature of the semiconductor laser increases. With this arrangement, the amplitude of the high-frequency signal is properly controlled even if there is a change in the temperature of the semiconductor laser.

The high-frequency superimposing control section may preferably control the amplitude in such a manner that, the amplitude decreases as the average value increases if the average value is less than a given threshold value, whereas the amplitude increases as the average value increases if the average value is larger than the threshold value. The high-frequency superimposing control section controls the amplitude in such a manner that, if the average value of the electric signal is less than a given threshold value, the amplitude of the high-frequency signal decreases as the average value increases, whereas, if the average value is larger than the threshold value, the amplitude increases as the average value increases. As a result, a proper amplitude control reflecting the relationship between the peak-to-average ratio and the average value is realized. Specifically, even when the output of the semiconductor laser varies, it becomes possible to prevent deterioration in the recording signal at the time of reproducing information from the optical recording medium and to perform stable reproduction over a long period of time.

The high-frequency superimposing control section may preferably include a linear speed acquiring section for acquiring a linear speed V of an optical recording medium from which information is to be reproduced by use of the emitted light. The high-frequency superimposing control section controls the amplitude in such a manner that the peak-to-average ratio is proportional to $\sqrt{(V/Vo)}$ at a standard linear speed Vo which is a standard value of the linear speed V. The high-frequency superimposing control section acquires the linear speed V of the optical recording medium to which the reproduction is to be made, and controls the amplitude of the high-frequency signal in such a manner that the peak-to-average ratio is proportional to $\sqrt{(V/Vo)}$ at a standard linear speed Vo. As a result, the amplitude of the high-frequency signal is properly controlled even if the linear speed of the optical recording medium varies.

The high-frequency superimposing control section may preferably include a data acquiring section for acquiring the first reference value by reading out, from the optical recording medium from which information is to be reproduced by use of the emitted light and on which an allowance value of the peak value of the emitted light is recorded, the recorded allowance value. The high-frequency superimposing control section reads out the allowance value recorded on the optical recording medium to which reproduction is to be made, and obtains the first reference value from the read allowance value. Therefore, the amplitude of the high-frequency signal can be properly controlled for each optical recording medium. Specifically, even in the case where the limit of the power that does not cause deterioration in the recording signal largely differs depending on the individual optical recording media, it is possible to prevent the deterioration in the recording signal at the time of reproducing information from the optical recording medium and to perform stable reproduction over a long period of time.

The high-frequency superimposing control section may preferably include a test executing section for judging the first reference value by recording a test pattern to be recorded into a test recording area of the optical recording medium from which information is to be reproduced by use of the emitted light and which has the test recording area and by reading the test pattern while varying the amplitude. The test executing section included in the high-frequency superimposing control section records the test pattern into the test recording area of the optical recording medium to which reproduction is to be made, and judges the first reference value by reading the test pattern while changing the amplitude of the high-frequency signal. As a result, the amplitude of the high-frequency signal can be properly controlled for each optical recording medium.

Preferably, the high-frequency superimposing control section may further include: a reference value recording section for recording the first reference value judged by the test executing section into the optical recording medium; and a data acquiring section for reading out the recorded first reference value from the optical recording medium on which the first reference value is recorded. The high-frequency superimposing control section includes the reference value recording section for recording the first reference value judged by the test executing section onto the optical recording medium, and the data acquiring section for reading the recorded first reference value from the optical recording medium. With this arrangement, the high-frequency superimposing control section can acquire the first reference value of the optical recording medium by reading out the first reference value that has been recorded on the optical recording medium in the past. Therefore, the test executing section is not needed to perform recording and reading of the test pattern every time the reproduction is made to one and the same optical recording medium.

The wavelength of the light emitted from the semiconductor laser may preferably be 390 nm<λ<420 nm. The wavelength λ of the light emitted from the semiconductor laser is 390 nm<λ<420 nm that is substantially corresponds to a blue-color area. Therefore, the peak-to-average ratio is controlled to fall within a proper range in the wavelength area in which the peak-to-average ratio may increase to a high value depending on the amplitude of the high-frequency signal. With this arrangement, it becomes possible to prevent deterioration in the recording signal at the time of reproduction and to perform stable reproduction over a long period of time for the optical recording medium that employs the wavelength area, that is, the optical recording medium that has a high recording density and therefore is largely affected by the deterioration in the signal caused by the peak power.

An inventive optical head device includes the above-mentioned inventive semiconductor laser driving device. Since the optical head device includes the semiconductor laser driving device, information can be reproduced from an optical recording medium without deterioration in the information recorded on the optical recording medium. Specifically, an optical head device capable of reproducing information from the optical recording medium with high reliability is realized.

An inventive optical information processing device includes the above-mentioned inventive optical head device. Since the optical information processing device includes the optical head device, information can be reproduced from an optical recording medium without deterioration in the information recorded on the optical recording medium. Specifically, an optical information processing device capable of reproducing information from the optical recording medium with high reliability is realized.

An inventive optical recording medium is an optical recording medium from which information is to be reproduced by the above-mentioned inventive semiconductor laser driving device and which records the allowance value. Since the optical recording medium records the allowance value to be read by the semiconductor laser driving device, at the time of reproducing information from the optical recording medium by use of the semiconductor laser driving device, the amplitude of the high-frequency signal be controlled in such a manner as to be suitable for the optical recording medium.

Although the present invention has been described in detail, the above-descriptions are just exemplary on all aspects, and never restrict the present invention thereto. It should be understood that an infinite number of unexemplified modifications are assumable without departing from the scope of the present invention.

The invention claimed is:

1. A semiconductor laser driving device comprising:
   a semiconductor laser for emitting light irradiated on an optical recording medium;
   a photodetecting element for receiving a part of the light emitted from the semiconductor laser and converting the part of light into an electric signal corresponding to a light amount;
   a laser driving circuit for inputting a driving signal into the semiconductor laser such that an average value of the electric signal coincides with a target value;
   a high-frequency superimposing circuit for superimposing a high-frequency signal over the driving signal; and
   a high-frequency superimposing control section for controlling an amplitude of the high-frequency signal,
   wherein the high-frequency superimposing control section is operable to control the amplitude of the high-frequency signal such that a peak-to-average ratio that is a ratio of a peak value of the electric signal with respect to the average value of the electric signal does not increase above a first reference value, and
   wherein the high-frequency superimposing control section is operable to control the amplitude of the high-frequency signal such that the amplitude decreases to lower the peak-to-average ratio as the average value increases, if the average value is less than a threshold value, and the amplitude increases to raise the peak-to-average ratio as the average value increases, if the average value is larger than the threshold value.

2. A semiconductor laser driving device according to claim 1, further comprising a peak detecting circuit for receiving the electric signal from the photodetecting element and for detecting the peak value of the electric signal, wherein the high-frequency superimposing control section is operable to calculate the peak-to-average ratio based on the peak value detected by the peak detecting circuit.

3. A semiconductor laser driving device according to claim 1, further comprising:
   a temperature sensor for measuring a temperature of the semiconductor laser; and
   a storing section for storing data indicative of a relationship of the average value, the temperature, the amplitude, and the peak-to-average ratio,
   wherein the high-frequency superimposing control section is operable to read out the data from the storing section and control the amplitude based on the data, the average value, and the temperature.

4. A semiconductor laser driving device according to claim 1, wherein the high-frequency superimposing control section is operable to control the amplitude such that the amplitude decreases as the temperature of the semiconductor laser increases.

5. A semiconductor laser driving device according to claim 1, wherein the high-frequency superimposing control section comprises a data acquiring section for acquiring the first reference value by reading out, from the optical recording medium from which information is to be reproduced by use of the emitted light and on which an allowance value of a peak value of the emitted light is recorded, the recorded allowance value.

6. A semiconductor laser driving device according to claim 1, wherein the semiconductor laser is operable to emit the light having a wavelength of 390 nm<$\lambda$<420 nm.

7. An optical head device comprising the semiconductor laser driving device of claim 1.

8. An optical information processing device comprising the optical head device of claim 7.

* * * * *